United States Patent [19]

Hopkins, Jr. et al.

[11] 4,033,908

[45] July 5, 1977

[54] POLYISOCYANURATE COMPOSITIONS AND FOAMS OF IMPROVED FRIABILITY AND PROCESS OF PREPARING SAME

[75] Inventors: Henry S. Hopkins, Jr., Ashland, Ohio; Donald L. Vargo, Blama, Sierra Leone

[73] Assignee: General Latex and Chemical Corporation, Cambridge, Mass.

[22] Filed: Aug. 25, 1975

[21] Appl. No.: 607,201

[52] U.S. Cl. .................. 260/2.5 AW; 260/2.5 AB; 260/2.5 AC; 260/30.4 N; 260/77.5 AB; 260/77.5 NC
[51] Int. Cl.² ........................................ C08G 18/14
[58] Field of Search .............. 260/2.5 AB, 2.5 AC, 260/2.5 AW, 77.5 AB, 77.5 NC, 30.4 N

[56] References Cited

UNITED STATES PATENTS

| 3,074,894 | 1/1963 | Loew et al. | 260/2.5 AM |
| 3,703,520 | 11/1972 | Carleton et al. | 260/2.5 AW |
| 3,736,298 | 5/1973 | Schmit et al. | 260/2.5 AW |
| 3,751,392 | 8/1973 | Olstowski | 260/2.5 AB |
| 3,759,916 | 9/1973 | Pitts et al. | 260/2.5 AW |
| 3,817,939 | 6/1974 | Allen et al. | 260/2.5 AW |
| 3,919,128 | 11/1975 | Baldino et al. | 260/2.5 AW |

OTHER PUBLICATIONS

*Journal of Organic Chemistry*, vol. 25, No. 6, pp. 1009-1012, (1960) Tsuzuki et al.

*Primary Examiner*—Eugene C. Rzucidlo
*Attorney, Agent, or Firm*—Richard P. Crowley

[57] ABSTRACT

In a process of preparing a polyisocyanurate foam, which process comprises: reacting a polyisocyanate in the presence of a trimerization catalyst and an expanding amount of an inert blowing agent to provide a polyisocyanurate foam, the improvement which comprises: carrying out the reaction in the presence of a plasticizing amount of a nonvolatile liquid carbonate to produce a polyisocyanurate foam having improved friability and dimensional stability properties.

19 Claims, No Drawings

POLYISOCYANURATE COMPOSITIONS AND FOAMS OF IMPROVED FRIABILITY AND PROCESS OF PREPARING SAME

BACKGROUND OF THE INVENTION

Polyisocyanates, such as aliphatic and aromatic isocyanates like diisocyanates, have been polymerized in the presence of a trimerization catalyst to provide rigid polyisocyanurate foams. The polyisocyanate trimerization reaction has been carried out in bulk and in solution to provide essentially cross-linked, very brittle and very friable foam products. The foam products are produced by combining polyisocyanate, an inert blowing agent, such as a low-boiling-point liquid like halocarbons, and one or more trimer catalysts like a tertiary amine, and mixing to effect the polyisocyanurate reaction. Typically, the reaction is exothermic on mixing the components, and no additional heating is required. The polyisocyanurate foams produced to date have not been commercially acceptable, and have been characterized by high brittleness and friability. Brittleness refers to the internal friability of the foam structure which remains essentially unchanged with time; that is, it is structural and molecular in nature, while friability refers to the state of the surface of the polyisocyanurate foam; that is, the powderability of the surface when subject to pressure, which friability changes with time.

Attempts to reduce the friability of polyisocyanurates have been made by modification of the polyisocyanurate principally through the introduction of other chemical linkages. Epoxy-modified isocyanurates have not been commercially acceptable, since they are expensive, the reaction is difficult to control and the materials exhibit limited processing properties. Imide-modified isocyanurates are very thermally stable with high thermal conductivity, but also are prepared from expensive raw materials. Carbodiimide-modified isocyanurates also are expensive and the reaction is difficult to control. The present-day, best, commercial products are the urethane-modified isocyanurate products which, although expensive, can be prepared by known and readily available commercial catalytic agents, and provide foams of relatively good thermal and flame-resistant properties.

In the preparation of such polyisocyanurate; i.e., trimer, foams consisting essentially of recurring cross-linked isocyanurate units and the modified polyisocyanurates, a wide variety of trimer catalysts and combinations have been suggested and used (see, for example, U.S. Pat. Nos. 3,487,080; 3,723,364; 3,736,298; and 3,759,916). Such trimer catalysts have included tertiary amines, such as N,N'-dialkylaminoalkyl phenols and the like.

The base trimerization of isocyanates in the presence of ethylene carbonate has been reported to result in the acceleration of the trimerization process and in the formation of a solid complex of the polyisocyanurate-ethylene carbonate (see Tsuzuki et al, "New Reactions of Organic Isocyanates. I. Reaction with Alkylene Carbonates," *Journal of Organic Chemistry*, Vol. 25, 1009, June 1960). Further, the reaction of propylene carbonates with polyisocyanurates is set forth in Saunders and Frisch, "Polyurethanes: Chemistry and Technology," *High Polymers*, Vol. XVI, Part 1, page 116, Interscience Publishing Co., Inc. Organic carbonates have also been used as modifiers in noncellular urethane resins (see U.S. Pat. No. 3,883,466).

It is, therefore, most desirable to provide trimer isocyanurate foams, both modified and unmodified, which have low friability while retaining the other desirable properties of such foams, and methods of preparing such foams which provide for improved and rapid process conditions and cure of the polyisocyanurate foams.

SUMMARY OF THE INVENTION

Our invention relates to polyisocyanurate foams of enhanced friability and to the process of preparing such foams. In particular, our invention concerns organic carbonate-polyisocyanurate foamable compositions and foams and the process of employing organic carbonate, such as alkylene carbonates, in the preparation of such compositions and foams.

Our invention comprises a polyisocyanurate foam which includes a plasticizing nonreactive amount of an organic carbonate therein to provide for a unique and unexpected reduction in the friability of the foam, both for modified and unmodified foams, but particularly as to unmodified polyisocyanurate foams; that is, foams consisting essentially of the isocyanate trimer with recurring isocyanurate linkages. We have found that the preparation of polyisocyanurate foams in the presence of organic cyclic carbonates and liquid alkylene carbonates like ethylene, propylene and butylene carbonates, in the preferred embodiments, and mixtures thereof, in amounts of, for example, from about 0.5 50% by weight of the composition, considerably and unexpectedly reduces the friability of the resulting foams. More particularly, we have discovered that low concentrations of generally from about 0.5 to 10% by weight considerably reduces the friability of unmodified or trimer polyisocyanurate foams, while, at higher concentration levels; for example, from about 25 to 50% by weight, the trimer foam products are enhanced in foam qualities approaching that or equal to the known polyisocyanurate modified foams, and approximately equivalent to the present normal polyurethane foam performances. The organic carbonates useful in our ivnention include, but are not limited to, those high-boiling-point nonvolatile cyclic and acyclic carbonates set forth in U.S. Pat. No. 3,883,466, herein incorporated by reference.

In contrast to the use of other nonreactive organic plasticizers, our organic carbonates, particularly at the preferred level, do not significantly alter the flammability characteristics of the foamed product as measured by commonly applied laboratory test methods. Other nonreactive plasticizer additives, such as organic plasticizers, significantly increase the flammability of the polyisocyanate foam at the high level of usage required to produce an acceptable nonfriable foam product with such plasticizers.

We have found that, by infrared analysis of our polyisocyanurate foams with the use of propylene carbonate, the propylene carbonate is present in the foam without chemical change; i.e., in its original structure. The effectiveness and advantage of liquid alkylene carbonate in the production of our polyisocyanurate foams over more commonly used plasticizers have been demonstrated in a number of experiments.

A wide variety of organic carbonates may be employed to reduce friability and to obtain the benefits of our invention; for example, particularly the liquid $C_2$–$C_6$ cyclic alkylene carbonates, such as propylene carbonate. Due to cost and ready availability, propylene carbonate is preferred.

We have found that the preferred alkylene carbonate provides for a polyisocyanurate foam of low density which has little initial friability, foam brittleness or shrinkage, all of which properties have been characteristics of previously unmodified trimer polyisocyanurate foams. Our polyisocyanurate foamable composition is a two-component, one-shot, foamable composition, which, on mixing the component parts, provides for the reaction of the components into a polyisocyanurate foam product, either by its own heat exotherm or reaction, or, if desired, by the addition of external heat. One component may comprise an isocyanate compound, either aliphatic or aromatic, which term also includes isocyanate-terminated urethane prepolymers, as well as polyol and other well-known modified polyisocyanurate prepolymers.

The isocyanate is subject to trimerization to a polyisocyanurate in the presence of a trimer catalyst. In particular, the preferred catalyst system is a combination of a major amount of a dialkylaminoalkyl phenol, such as dimethylaminomethyl phenol, and a minor amount of triethylene diamine in a cocatalyst system as set forth in the copending U.S. patent application of Henry S. Hopkins, Jr., U.S. Ser. No. 596,367, filed July 16, 1975, entitled POLYISOCYANURATE FOAMS PREPARED BY A COCATALYST SYSTEM.

The second component of the composition comprises a trimerization catalyst system, such as a tertiary amine metal salt or other trimer catalyst, either alone or in combination, and typically in an amount of from about 0.5 to 15% by weight. In addition, the second component includes an expanding amount of an inert blowing agent, typically a liquid compound, such as a hydrocarbon or halocarbon, which volatilizes during the trimerization exothermic reaction to produce the cellular or foam structure, or a chemical blowing agent which decomposes by an in-situ generation of an inert gas. Typical blowing agents include, for example, a fluorine-containing lower alkene, such as difluoro dichloro methane or trichloro monofluoro methane and other well-known agents. The second component may also include a surfactant or cell-control agent, such as a silicone product or a silicone glycol ether product, to aid in the preparation of the foam and to control cell size. Other additives of the second component may include plasticizers, such as nonvolatile liquid esters, hydrocarbons, phosphates and the like, and other additives or modifying agents, such as flame and smoke-retardant additives, stabilizers, synergists, polyols, resins, fillers and the like.

A wide variety of organic isocyanates may be employed which are subject to trimerization which includes, but is not limited to: methylene bis phenyl isocyanate and its isomers and mixtures thereof; polymethylene polyphenyl polyisocyanate; meta or para phenylene diisocyanate; hexamethylene diisocyanate; toluene diisocyanate; diphenylmethane diisocyanate and the like. The alkylene carbonates may be added to either or both components or added directly after mixing the two components. The process is carried out by simply mixing the components, with the reaction occurring in the presence of the catalyst system at room temperature (60°-80° F) by virtue of the reaction exotherm.

Our invention will be described and set forth for the purpose of illustration only in connection with the following examples; however, it is recognized and is part of our invention that various substitutions and modifications can be made in the formulations and techniques without departing from the spirit and scope of our invention.

DESCRIPTION OF THE EMBODIMENTS

A master formulation (Parts A and B) was prepared and the parts mixed to provide a polyisocyanurate foam with the amount of plasticizer remaining constant, but wherein the plasticizer compound was changed. The remitting foam was then visually examined and tested for friability and a ball drop test was carried out on the cured foam.

TABLE I

| Master Formulation | Parts by Weight |
|---|---|
| Part A | |
| Mondur MR (a crude polymeric isocyanate of polymethylene polyphenyl diisocyanate from Mobay Chemical Co.) - various isocyanates can be used with NCO/OH $\geq$ 5000 | 66.66 |
| Part B | |
| 1. Amine cocatalyst system | |
|     dimethylaminomethyl phenol | 5.43 |
|     triethylene diamine | 0.77 |
| 2. Surfactant cell-control agent - DC-193 silicone-glycol copolymer of Dow Corning Co. | 2.33 |
| 3. Blowing agent | |
|     fluorotrichloromethane | 17.06 |
| 4. Plasticizer | 7.75 |
| | 100.00 |

TABLE II

| Formulation No. | Plasticizer | Result |
|---|---|---|
| 1 | Butyl cellosolve | Very friable |
| 2 | Phosgard C-22R[1] (chlorinated phosphate ester) | Extreme friability |
| 3 | Firemaster T-23P[2] (tris (2,3-dibromo propyl phosphate) | Extreme friability |
| 4 | Cellosolve acetate | Moderate friability |
| 5 | Fyrol CEF[3] (tris (2-chloroethyl phosphate) | Moderate friability |
| 6 | Antiblaze 78[4] (chlorinated phosphate) | No foam rise |
| 7 | Dioctylphthalate | Very friable |
| 8 | Propylene carbonate | No friability |
| 9 | Wingstay T[5] (hindered phenol) | Very friable |

[1] a trademark of Monsanto Chemical
[2] a trademark of Michigan Chemical
[3] a trademark of Stauffer Chemical
[4] a trademark of Mobile Oil
[5] a trademark of Goodyear Chemical Ball-drop testing of the cured foams from above confirms the presence of more brittle polymer formation, except for propylene carbonate formulation No. 8. All of the foams are "powdered" in the impact indentation area.

In addition, heat-aging of the foam products shows that the propylene carbonate provides also for improved dimensional stability of the foam.

TABLE III

Dry heat-aging of the above formula for 4 hours at 200° F:

No. 1 Moderate Shrinkage     No. 6 Moderate Shrinkage
No. 2 Moderate Shrinkage     No. 7 Moderate Shrinkage
No. 3 Moderate Shrinkage     No. 8 No Observable Dimension Change
No. 4 Severe Shrinkage

TABLE III-continued

Dry heat-aging of the above formula for 4 hours at 200° F:

No. 5 Moderate Shrinkage  
No. 9 Moderate Shrinkage

Further experiments using the same master formula of Table I, but with an increase in the dimethylaminomethyl phenol catalyst to 12% in an attempt to cure more completely the polymer, did not significantly alter the test results. An increase in the foam density from 2.0 pcf to 3.0 pcf also produced similar results. Other variables, such as NCO/OH ratio, cell size and reaction speeds (all within the constraint of producing adequate foams), did not significantly alter the test results.

Comparison testing of propylene carbonate indicates that concentration levels follow the results of other plasticizers, with the notable exception of the minimum level necessary for use. Most plasticizers become effective in reducing (or eliminating) friability at 15–30% by weight, whereas propylene carbonate gives an equivalent performance at levels of 4–10% by weight. The obvious advantage of lower level use is economic; however, a lower level also gives a better foam product from the standpoint of physical properties.

Dry heat-aging at 400° F for 4 weeks discolors and embrittles propylene carbonate-containing foams; however, no other plasticizer tested at any concentration level survives even short time periods at 400° F (1 day or longer). Dry aging at 300°–350° F indicates no significant dimensional change for alkylene carbonate-containing trimers, while other plasticizer-containing trimers are discolored, further embrittled and have severe dimensional change.

Thus, we have discovered that organic carbonates can significantly improve the friability and dimensional stability of polyisocyanurate foams.

What we claim is:

1. In a process of preparing a polyisocyanurate foam, which process comprises: reacting a polyisocyanate in the presence of a trimerization catalyst and an expanding amount of an inert blowing agent in a foamable composition to provide a polyisocyanurate foam, the improvement which comprises:
    carrying out the reaction in the presence of a plasticizing amount of a nonreactive liquid organic carbonate, thereby producing a polyisocyanurate foam having improved friability and dimensional stability properties.

2. The process of claim 1 wherein the carbonate comprises from about 0.5 to 50% by weight of the composition.

3. The process of claim 1 wherein the carbonate is a $C_2$–$C_6$ cyclic carbonate.

4. The process of claim 1 wherein the carbonate is propylene carbonate in an amount of from about 4 to 10% by weight of the composition.

5. The process of claim 1 wherein the trimerization catalyst is a cocatalyst which comprises a dialkylaminoalkyl phenol and a triethylene diamine.

6. The process of claim 5 wherein the dialkylaminoalkyl phenol is dimethylaminomethyl phenol.

7. The process of claim 1 wherein the blowing agent is an inert fluorine-containing lower alkene liquid or hydrocarbon liquid which volatilizes during the exothermic catalytic reaction to produce the polyisocyanurate foam.

8. The process of claim 1 wherein the reaction composition includes a silicone surfactant as a cell-control agent.

9. The process of claim 1 wherein the polyisocyanate is an organic diisocyanate.

10. The process of claim 1 wherein the polyisocyanate is a diisocyanate and the reaction consists essentially of the diisocyanate to produce an unmodified trimer polyisocyanurate foam.

11. The process of claim 1 wherein the polyisocyanate is an isocyanate-terminated urethane prepolymer.

12. In a process of preparing a polyisocyanurate foam consisting essentially of recurring isocyanurate linkages, which process comprises: reacting an organic diisocyanate, in the presence of a dialkylaminoalkyl phenol and a tris ethylene diamine as a cocatalyst and in the presence of a blowing amount of an inert blowing agent which volatilizes during the exothermic catalytic reaction, in a foamable composition to provide a polyisocyanurate foam of improved friability and dimensional stability, the improvement which comprises:
    carrying out the reaction in the presence of from about 1 to 10% by weight of the composition of nonreactive propylene carbonate to provide a polyisocyanurate foam of improved friability and dimensional stability.

13. A polyisocyanurate foam which comprises a cured, cellular, polyisocyanurate foam which contains a plasticizing amount of a nonreacted liquid organic carbonate therein, the foam characterized by improved friability and substantially no observable shrinkage on heat-aging at temperatures up to 200° F for times up to 4 hours.

14. The foam of claim 13 wherein the carbonate comprises from about 0.5 to 50% by weight of the foamable composition from which the foam is prepared.

15. The foam of claim 13 wherein the carbonate is propylene carbonate.

16. The foam of claim 13 wherein the carbonate is propylene carbonate in an amount of from about 4 to 10% by weight of the foamable composition from which the foam is prepared.

17. The foam of claim 13 wherein the polyisocyanurate foam consists essentially of recurring isocyanurate linkages.

18. The foam of claim 13 wherein the foam is derived from the reaction of an organic diisocyanate in the presence of a trimerization catalyst which comprises a dialkylaminoalkyl phenol and a triethylene diamine.

19. The foam of claim 13 wherein the polyisocyanate foam is derived from a polyethylene polyphenol diisocyanate.

* * * * *